UNITED STATES PATENT OFFICE.

ERNEST NIENSTAEDT, OF NEW YORK, N. Y., ASSIGNOR OF ONE-HALF TO LEO GOLDMARK, OF SAME PLACE.

INK.

SPECIFICATION forming part of Letters Patent No. 523,863, dated July 31, 1894.

Application filed October 25, 1893. Serial No. 489,121. (No specimens.)

*To all whom it may concern:*

Be it known that I, ERNEST NIENSTAEDT, a citizen of the United States, and a resident of New York, in the county and State of New York, have invented a certain new and useful Improvement in Inks, of which the following is a specification.

My invention has reference to an improved ink, and the invention consists of hard granules the surfaces of which are covered with a dry ink compound, which compound is successively dissolved by the addition of water, so that by the combination of the water with the ink compound a good liquid writing ink is obtained.

In preparing my improved ink, I granulate any suitable hard non-porous matter, preferably quartz, so that I obtain granules of a diameter of about one-sixteenth of an inch. The granules are thrown into a liquid ink of any composition and any color, and the aqueous portion of the ink is then evaporated by heat or in the atmospheric air. The residues of the ink are thus retained and cover entirely the surfaces of the granules, which, when they are dried, can be handled like any dry powder, as the ink-residues reliably stick on the surfaces of the granules.

When the ink is to be used, a small portion of the granules is thrown into an ink-stand and a little water, just enough to be in level with the granules, is then added thereto. A sufficient quantity of the ink residues is at once dissolved in the water to convert the latter into a very good fluid writing ink. As soon as the liquid is used up, the water is renewed, and so on until the covering of the granules is consumed. Then the granules are removed from the ink stand and new covered granules are put into the same which are treated in the described manner.

My ink-granules have many advantages, viz: They can be shipped without any danger, as the breakage of bottles used for liquid ink, is done away with by my dry granules; they leave no sticky residues in the ink-stand which is always the case with the liquid ink now in use; the granules in the ink serve to keep the pen always clean and sharp, as the edges of the granules continuously wipe the pen when it is slipped into the ink stand; they are especially of great use to travelers which by means of the dry granules and a small quantity of water have always a good ink on hand.

I am aware that dry powders, for instance, infusorial earth, charged with coloring matter and with an oleaginous constituent have been used heretofore for coloring fibrous materials, and I do not claim such powders broadly.

What I claim is—

As a new article of manufacture granules of hard, non-porous matter covered with a layer of dry ink, which has been applied to the granules by throwing the same into a liquid ink and evaporating the aqueous portion of the ink, substantially as set forth.

Signed at New York, in the county and State of New York, this 16th day of October, 1893.

ERNEST NIENSTAEDT.

Witnesses:
CHARLES KARP,
JULIUS ASHER.